Patented July 3, 1945

2,379,832

UNITED STATES PATENT OFFICE 2,379,832

PROCESS FOR THE MANUFACTURE OF UNSATURATED KETONES OF THE CYCLOPENTANO POLYHYDRO PHENANTHRENE SERIES

Arthur Serini, Berlin N. 65, Heinrich Köster, Berlin-Charlottenburg, and Lothar Strassberger, Berlin-Wilmersdorf, Germany, assignors, by mesne assignments, to Schering Corporation, Bloomfield, N. J., a corporation of New Jersey No Drawing. Application June 1, 1937, Serial No. 145,824. In Germany June 2, 1936

21 Claims. (Cl. 260—397.3)

This invention relates to a process for the manufacture of unsaturated ketones of the cyclopentano-polyhydrophenanthrene series from the corresponding unsaturated secondary alcohols. It relates in particular for example to the manufacture of unsaturated sterol ketones such as cholestenone or sitostenone from cholesterol or sitosterol, the manufacture of unsaturated ketones of the pregnane series, as for example pregnendione, from pregnendiol or pregnenolone and the manufacture of unsaturated ketones of the androsterone series, such as androstendione or testosterone, from dehydro-androsterone or androstendiol.

The oxidation of unsaturated secondary alcohols of the cyclopentano-polyhydrophenanthrene series to the corresponding unsaturated ketones is already known, compare for example:

Diels and Abderhalden, Berichte 37, 3099,
Diels, Gädke, Körting, Annalen 459, 21,
Windaus, Berichte 39, 518,
Butenandt and Westphal, Berichte 69, pages 443, 447.

As oxidising agents chiefly copper oxide and chromic acid are employed; the yields in these processes are moderate and lie between about 25 and 60%. With the application of chromic acid it is recommended to protect the double bond by addition and subsequent splitting off of halogen or halogen hydride. The process thereby becomes considerably more cumbersome and the yields are not essentially higher but vary between about 40 to 60%.

These unsaturated ketones are chiefly substances of valuable physiological properties and particular therapeutic value. An improvement of their method of production is therefore of considerable commercial importance.

The process of the present invention renders possible the production of these unsaturated ketones of the cyclopentano-polyhydrophenanthrene series from the corresponding secondary alcohols with practically quantitative yield. It depends upon an exchange of oxidation stages between the secondary alcohols and an added aldehyde or ketone in the presence of metal alcoholates.

The principle of the exchange of oxidation stages is already known: cf. Meerwein and Schmidt, Annalen 444, 221 and Ponndorf, Zeitschr. f. angew. Chemie 39, 138.

As these authors emphasize it is necessary for the completion of the exchange to remove one reaction component during the reaction and in fact always the oxidation product is removed, either by physical methods (distillation) or by secondary chemical change (esters being formed in the case of an aldehyde). The latter process therefore does not allow of the recovery of the oxidation product. In this connection it may be mentioned that Meerwein and Schmidt refer to their process as a reduction process. On the other hand the recovery of the oxidation product from the reaction mixture by distillation takes place easily since the boiling points of aldehydes and ketones are lower than the boiling points of the corresponding alcohols. A necessary requirement is however the sufficient volatility of the products concerned. Nothing is stated regarding the applicability of the principle of the exchange of oxidation stages to the production of non-volatile or extremely difficultly volatile ketones such as those of the cyclopentano-polyhydrophenanthrene series. Apparently if the ketones are not removed from the reaction it was considered that they should undergo a secondary chemical change like the aldehydes.

According to the present invention the manufacture of unsaturated ketones of the cyclopentano-polyhydrophenanthrene series from the corresponding secondary alcohols takes place extraordinarily smoothly when the latter, as metal alcoholates, or in the presence of other metal alcoholates, are treated with an excess of a ketone or aldehyde. The larger the excess of ketone or aldehyde the more complete the oxidation.

The ketones of the cyclopentano-polyhydrophenanthrene series, when the oxidation is well conducted, are obtained in such a degree of purity that their complete purification is possible by simple recrystallisation. If desired, however, chemical purification methods can also be employed by causing the reaction product to react with ketone reagents such as semi-carbazide and the like or with hydroxyl reagents for the purpose of removal of unoxidised alcohol. The latter can be subjected to a further treatment whereby a practically quantitative yield of ketone is obtained.

The following examples serve to illustrate the invention without, however, limiting the same to them.

*Example 1*

3.86 grams of cholesterol are dissolved in 100 grams of cyclohexanone; this solution is treated with 3.4 grams of aluminium-isopropylate, heated for 4 hours to 100° C. and thereupon distilled with steam. The residue is taken up with ether. After drying and evaporation of the ether there remains in quantitative yield the sterol portion, which after washing with a little methanol exhibits a melting point of 78° C. Interaction with semicarbazide yields the semicarbazone of cholestenone of M. P. 234° C. with 90% yield.

*Example 2*

A solution of 3.86 grams of cholesterol and 1 gram of aluminium-isopropylate in 60 grams of xylene is gradually heated to boiling whereby 0.56 gram of isopropyl-alcohol distils off together with about 25 grams of xylene. The remaining solution of the aluminium-cholosterylate is thereupon treated with 100 grams of cyclohexanone and heated for 4 hours to 100° C. After steam distillation and ether extraction in quantitative yield a practically pure cholestenone is obtained which can be freed from small quantities of unchanged cholesterol by treatement with phthalic anhydride in pyridine.

*Example 3*

3.86 grams of cholesterol are treated with 3 grams of magnesium chlorethylate and 100 grams of cyclohexanone in an analogous manner to that described in Example 1 and worked up. The yield is the same as in Example 1.

*Example 4*

1.6 grams of pregnenol-3-one-20 are dissolved at 120° C. in 50 ccs. of cyclohexanone and after the addition of 1.7 grams of aluminium-isopropylate allowed to stand for 10 minutes at this temperature. After cooling the whole is distilled with steam and the residue taken up with ether. After drying and evaporation of the ether the oxidation product remains in quantitative yield. It exhibits a melting point of 125 to 127° C. and the physiological activity of the corpus luteum hormone (in the Clauberg-Test 1 rabbit unit in 0.7 mg.).

*Example 5*

1.5 grams of dehydro-androsterone are heated with 1.5 grams of aluminium-isopropylate in 50 ccs. of cyclohexanone for half an hour to 100° C. The reaction mixture is distilled with steam. The residue of the steam distillation is after cooling treated with dilute sulphuric acid for the dissolving of the aluminium-hydroxide suspension. The androstendione separated in solid form is after filtration obtained in quantitative yield and purified by crystallisation from dilute acetone.

*Example 6*

To a solution heated to 100° C. of 1 gram of androstendiol-monobenzoate-17 in 25 grams of cyclohexanone 0.85 gram of aluminium-isopropylate is added, the whole is shaken for a short time until a clear solution is produced and further heated for 30 minutes to 100° C. After rapid cooling the whole is distilled with steam until nothing more passes over and the distillation residue taken up in ether, the ether solution dried and the ether evaporated. The solid ether residue is ground with petrol ether and filtered with suction. 0.95 gram of crude testosterone-benzoate is obtained which in ethanol gives a rotation of $[\alpha]_{20}^D = +140°$.

For the purpose of removal of small quantities of starting material the substance is heated with 1 gram of phthalic anhydride in 10 ccs. of pyridine for 4 hours to 80–90° C. After cooling the whole is poured into water, taken up in ether, the ethereal solution washed consecutively with dilute sulphuric acid and dilute caustic soda lye, dried and the ether evaporated. The ether residue is recrystallised from methanol, whereby 0.8 gram of pure testosterone-benzoate of M. P. 190° and rotation $[\alpha]_{20}^D = +160°$ is obtained.

*Example 7*

10 grams of stigmasterol are dissolved in 200 grams of dry acetone, a solution of 12 grams of crystallised aluminium-isopropylate in 300 ccs. of benzene added and the mixture boiled for 10 hours under reflux. The reaction solution is thereupon shaken several times with dilute sulphuric acid, washed with water, dried with sodium sulphate and the benzene evaporated in vacuum. The weak yellow colored residue is recrystallised from methanol and yields stigmastadienone in beautiful crystals. The melting point of the product which is obtained in a yield of 5 grams amounts to 107° C.

*Example 8*

3.86 grams of cholesterol and 3.4 grams of aluminium-isopropylate are dissolved in 120 grams of anhydrous acetophenone. Then the reaction mixture is heated for 3 hours to 120° C. and finally subjected to steam distillation. Working up takes place as in Example 1. By crystallisation from acetone 3.3 grams of cholestenone of M. P. 79° C. are obtained.

*Example 9*

1.0 gram of androstendiol-monobenzoate-17 is dissolved in 25 grams of anhydrous cyclohexanone and the solution heated to 100° C. Then 1.0 gram of solid tertiary aluminium-butylate is added and after 30 minutes standing at the said temperature the mixture is worked up as in Example 6. 0.94 gram is obtained of still impure testosterone-benzoate $[\alpha]_D^{20} = +149°$.

By treatment with phthalic anhydride there can be obtained therefrom 0.86 gram of pure testosterone benzoate M. P. 191° C., $[\alpha]_D^{20} = +159°$.

*Example 10*

1.6 grams of pregnenol-3-one-20 and 1.7 grams of aluminium-isopropylate are dissolved in 29.0 grams of acetone and 58.0 grams of xylene and heated to boiling for 9 hours under a reflux condenser. Then the reaction mixture is poured into acidified water whereby the coloured condensation products of the acetone pass into the aqueous phase. The xylene solution is washed several times and dried and after evaporation in vacuum leaves 1.54 grams of crystalline residue permeated by a small quantity of an oily reaction product. By recrystallisation from ether there can be recovered therefrom 1.2 grams of corpus luteum hormone of M. P. 128° C., $[\alpha]_D^{20} = 193.1°$.

Of course, various modifications and changes in the reaction conditions, etc., may be made by those skilled in the art in accordance with the principles set forth herein and in the claims annexed hereto.

What we claim is:

1. Process for the manufacture of unsaturated ketones of the cyclopentano polyhydro phenanthrene series, which comprises reacting an unsaturated secondary alcohol of the cyclopentano polyhydro phenanthrene series with a member of the group consisting of aldehydes and ketones in the presence of a metal alcoholate of an alcohol having a

group, said alcoholate being active to promote an exchange of oxidation stages.

2. Process for the manufacture of unsaturated ketones of the cyclopentano polyhydro phenanthrene series, which comprises reacting an unsaturated secondary alcohol of the cyclopentano polyhydro phenanthrene series with a member of the group consisting of aldehydes and ketones in the presence of a magnesium alcoholate of an alcohol having a

group, said alcoholate being active to promote an exchange of oxidation stages.

3. Process according to claim 1, in which the aldehyde or ketone is employed in excess.

4. Process according to claim 1, wherein the metal is bound to the starting material in the form of the corresponding alcoholate by treatment of the starting material in the oxidation mixture with a metal alcoholate of another alcohol having a

group.

5. Process according to claim 1, wherein the starting material is pregnenolone.

6. Process according to claim 1, wherein the starting material is a 17-monoester of androstendiol-3,17.

7. Process according to claim 1, wherein the starting material is dehydro-androsterone.

8. Process for the manufacture of unsaturated ketones of the cyclopentano polyhydro phenanthrene series from the corresponding unsaturated secondary alcohols, which comprises subjecting such alcohol directly to the action of a compound of the group consisting of aldehydes and ketones in the presence of a secondary metal alcoholate active to promote an exchange of oxidation stages.

9. Process for the manufacture of unsaturated ketones of the cyclopentano polyhydrophenanthrene series from the corresponding unsaturated secondary alcohols, which comprises subjecting such alcohol to the action of an excess of a compound from the group consisting of aldehydes and ketones in the presence of a metal alcoholate of a monohydric lower aliphatic alcohol having a

group, said alcoholate being active to promote an exchange of oxidation stages.

10. Process for the manufacture of unsaturated ketones of the cyclopentano polyhydrophenanthrene series from the corresponding unsaturated secondary alcohols, which comprises subjecting such alcohol to the action of an excess of a compound from the group consisting of aldehydes and ketones in the presence of a metal alcoholate of a secondary alcohol, said alcoholate being active to promote an exchange of oxidation stages.

11. Process for the manufacture of unsaturated ketones of the cyclopentano polyhydrophenanthrene series from the corresponding unsaturated secondary alcohols, which comprises subjecting such alcohol to the action of an excess of a compound from the group consisting of aldehydes and ketones in the presence of a secondary aluminium alcoholate.

12. Process for the manufacture of unsaturated ketones of the cyclopentano polyhydrophenanthrene series from the corresponding unsaturated secondary alcohols, which comprises subjecting such alcohol to the action of an excess of a compound from the group consisting of aldehydes and ketones in the presence of a member of the group consisting of aluminium and chlor-magnesium alcoholates of alcohols having a

group.

13. Process for the manufacture of unsaturated ketones of the cyclopentano polyhydrophenanthrene series from the corresponding unsaturated secondary alcohols, which comprises subjecting such alcohol to the action of an excess of a compound from the group consisting of aldehydes and ketones in the presence of aluminium isopropylate.

14. The process of preparing unsaturated keto compounds of the cyclopentano polyhydrophenanthrene series, which comprises subjecting the corresponding secondary alcohol to the action of an excess of a compound selected from the group consisting of aldehydes and ketones in the presence of an aluminium alcoholate of a monohydric, secondary alcohol.

15. Process for the manufacture of testosterone esters, which comprises reacting the 17-monoester of androstendiol with an excess of a ketone in the presence of a secondary aluminium alcoholate.

16. Process for the manufacture of unsaturated ketones of the cyclopentano polyhydro phenanthrene series, which comprises reacting an unsaturated secondary alcohol of the cyclopentano polyhydro phenanthrene series with a member of the group consisting of aldehydes and ketones in the presence of an aluminium alcoholate of said secondary alcohol.

17. Process for the manufacture of unsaturated ketones of the cyclopentano polyhydro phenanthrene series, which comprises reacting an unsaturated secondary alcohol of the cyclopentano polyhydro phenanthrene series with a member of the group consisting of aldehydes and ketones in the presence of a magnesium alcoholate of said secondary alcohol.

18. Process for the manufacture of cholestenone, which comprises reacting cholesterol with a member of the group consisting of aldehydes and ketones in the presence of aluminium isopropylate.

19. Process for the manufacture of pregnendione, which comprises reacting pregnenolone with a member of the group consisting of aldehydes and ketones whose corresponding alcohols are readily volatile, in the presence of a secondary aluminium alcoholate.

20. Process for the manufacture of testosterone esters, which comprises reacting a 17-mono-ester of androstendiol with a member of the group consisting of aldehydes and ketones in the presence of aluminium isopropylate.

21. Process for the manufacture of unsaturated ketones of the cyclopentano polyhydro phenanthrene series, which comprises reacting an unsaturated secondary alcohol of the cyclopentano polyhydro phenanthrene series in the form of a metal alcoholate with a member of the group consisting of aldehydes and ketones, said alcoholate being active to promote an exchange of oxidation stages.

ARTHUR SERINI.
HEINRICH KÖSTER.
LOTHAR STRASSBERGER.